United States Patent
Rattunde

(10) Patent No.: US 10,562,143 B2
(45) Date of Patent: Feb. 18, 2020

(54) METHOD FOR REDUCING THE REGENERATIVE CHATTER OF CHIP-REMOVAL MACHINES

(71) Applicant: Rattunde & Co GmbH, Ludwigslust (DE)

(72) Inventor: Ulrich Rattunde, Bentwisch (DE)

(73) Assignee: Rattunde AG, Ludwigslust (DE)

( * ) Notice: Subject to any disclaimer, the term of this patent is extended or adjusted under 35 U.S.C. 154(b) by 1 day.

(21) Appl. No.: 15/553,086

(22) PCT Filed: Feb. 23, 2016

(86) PCT No.: PCT/EP2016/053797
§ 371 (c)(1),
(2) Date: Aug. 23, 2017

(87) PCT Pub. No.: WO2016/135157
PCT Pub. Date: Sep. 1, 2016

(65) Prior Publication Data
US 2018/0036851 A1 Feb. 8, 2018

(30) Foreign Application Priority Data

Feb. 27, 2015 (DE) .......................... 10 2015 002 483

(51) Int. Cl.
*B23C 5/10* (2006.01)
*B23Q 11/00* (2006.01)
(Continued)

(52) U.S. Cl.
CPC .......... *B23Q 11/0039* (2013.01); *B23B 5/167* (2013.01); *B23B 27/002* (2013.01);
(Continued)

(58) Field of Classification Search
CPC .............. B23B 27/002; B23B 2250/16; B23B 2215/72; B23B 2270/30; B23B 5/167;
(Continued)

(56) References Cited

U.S. PATENT DOCUMENTS 2,563,559 A * 8/1951 Sneva ................... B23D 61/026
29/527.6
2,606,366 A * 8/1952 Stevens .................... A61C 3/02
188/268
(Continued)

FOREIGN PATENT DOCUMENTS

CN 1886223 A 12/2006
DE 24 34 196 2/1975
(Continued)

OTHER PUBLICATIONS

Thomson Scientific, London, GB; AN 1980-A8418C, XP002757899 & SU 660 785 A (Diamond Cut Radial) May 10, 1979, abstract.

*Primary Examiner* — Sara Addisu
(74) *Attorney, Agent, or Firm* — Bay State IP, LLC

(57) ABSTRACT

A method for reducing regenerative chatter in chip-removal machines wherein a tool head (2) machines walls of a workpiece (1) by means of at least one chip-removal tool and during this machining, the tool head is vibrationally excited and a loose additional mass ($m_z$) is moved by the vibration. The additional mass randomly touches the tool head (2) in first position or randomly has no connection to the tool head (2) in second position, and thus the total mass of the tool head (2) is randomly changed by the amount of the additional mass ($m_z$). This change in mass of the tool head in turn changes the frequency of vibration.

4 Claims, 7 Drawing Sheets

Figure 1:
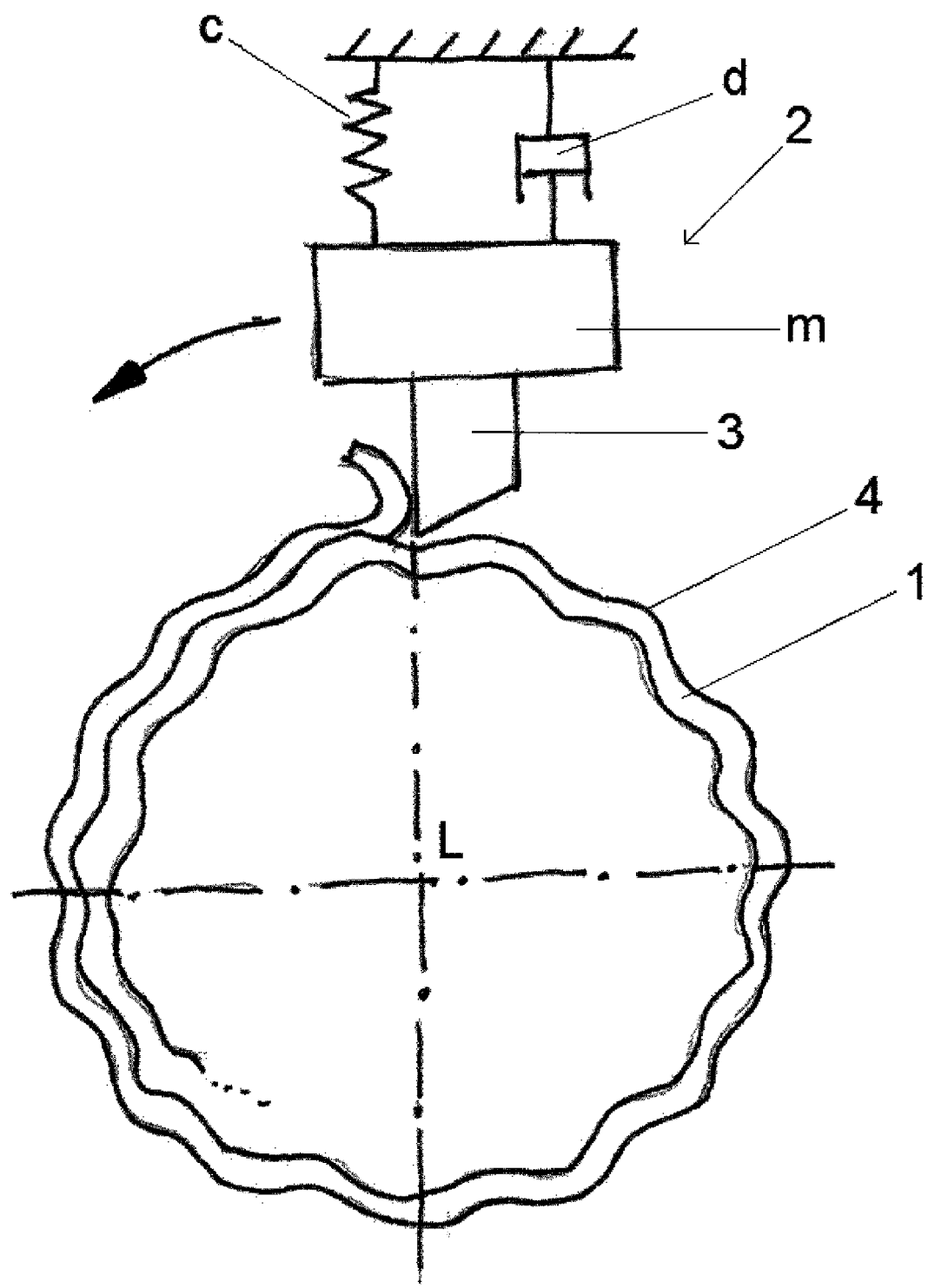

(51) Int. Cl.
  *B23B 5/16* (2006.01)
  *B23B 27/00* (2006.01)
  *B23C 5/00* (2006.01)
(52) U.S. Cl.
  CPC ....... *B23B 2215/72* (2013.01); *B23B 2250/16* (2013.01); *B23B 2270/30* (2013.01); *B23C 5/003* (2013.01)
(58) Field of Classification Search
  CPC ................ B23C 5/003; B23Q 11/0039; Y10T 409/304312; Y10T 408/76
  See application file for complete search history.

(56) References Cited

U.S. PATENT DOCUMENTS

| | | | | | |
|---|---|---|---|---|---|
| 2,656,742 | A | * | 10/1953 | Poole | B23B 29/022 188/322.5 |
| 2,699,696 | A | * | 1/1955 | Hahn | B23B 29/022 188/378 |
| 3,559,512 | A | * | 2/1971 | Aggarwal | B23B 29/022 188/322.5 |
| 3,612,222 | A | * | 10/1971 | Minor | E04B 1/985 188/268 |
| 3,642,378 | A | * | 2/1972 | Hahn | B23B 29/022 408/143 |
| 3,774,730 | A | * | 11/1973 | Maddux | B23B 29/022 188/379 |
| 3,820,422 | A | * | 6/1974 | Rivin et al. | B23B 29/022 408/143 |
| 3,838,936 | A | * | 10/1974 | Andreassen | B23B 29/022 188/268 |
| 3,848,931 | A | * | 11/1974 | Swisher | B25D 17/02 299/100 |
| 3,923,414 | A | * | 12/1975 | Hopkins | B23B 29/022 408/143 |
| 4,044,845 | A | * | 8/1977 | Rumpp | B23B 31/005 173/DIG. 2 |
| 4,061,438 | A | * | 12/1977 | New | B23B 29/022 408/143 |
| 4,068,742 | A | * | 1/1978 | Resare | B25D 17/24 181/230 |
| 4,086,984 | A | * | 5/1978 | Johansson | B25D 17/24 181/230 |
| 4,553,884 | A | * | 11/1985 | Fitzgerald | B23B 29/022 408/143 |
| 4,616,738 | A | * | 10/1986 | Shurtliff | B23B 29/022 188/380 |
| 4,864,904 | A | * | 9/1989 | Mishiro | B23Q 15/013 82/137 |
| 6,929,431 | B2 | * | 8/2005 | Bergholt | B23B 29/022 408/143 |
| 7,234,379 | B2 | * | 6/2007 | Claesson | B23B 27/002 188/380 |
| 8,371,776 | B2 | * | 2/2013 | Lin | B23B 27/002 408/143 |
| 9,993,876 | B2 | * | 6/2018 | Hecht | B23B 27/002 |
| 2002/0036091 | A1 | * | 3/2002 | Claesson | B23B 29/022 173/162.1 |
| 2003/0147707 | A1 | * | 8/2003 | Perkowski | B23B 29/022 407/30 |
| 2003/0170084 | A1 | * | 9/2003 | Bergholt | B23B 51/048 408/143 |
| 2005/0109182 | A1 | * | 5/2005 | Murakami | B23B 27/002 83/651 |
| 2007/0089574 | A1 | * | 4/2007 | Murakami | B23B 27/002 82/158 |
| 2008/0019782 | A1 | * | 1/2008 | Imai | B23B 27/20 407/11 |
| 2010/0096228 | A1 | * | 4/2010 | Digernes | B23B 27/002 188/269 |
| 2010/0242696 | A1 | * | 9/2010 | Digernes | B23B 27/10 83/169 |
| 2013/0004250 | A1 | * | 1/2013 | Gamble | B23C 5/003 407/40 |
| 2016/0107242 | A1 | * | 4/2016 | McCormick | B23B 31/08 279/143 |

FOREIGN PATENT DOCUMENTS

| | | | |
|---|---|---|---|
| DE | 27 04 174 | 9/1977 | |
| DE | 10 2009 009 212 | 6/2010 | |
| DE | 10 2012 012279 | 1/2013 | |
| DE | 202013008019 U1 * | 9/2013 | ............ B23B 31/02 |
| EP | 1 693 131 | 8/2006 | |
| JP | H10 128635 | 5/1998 | |

* cited by examiner

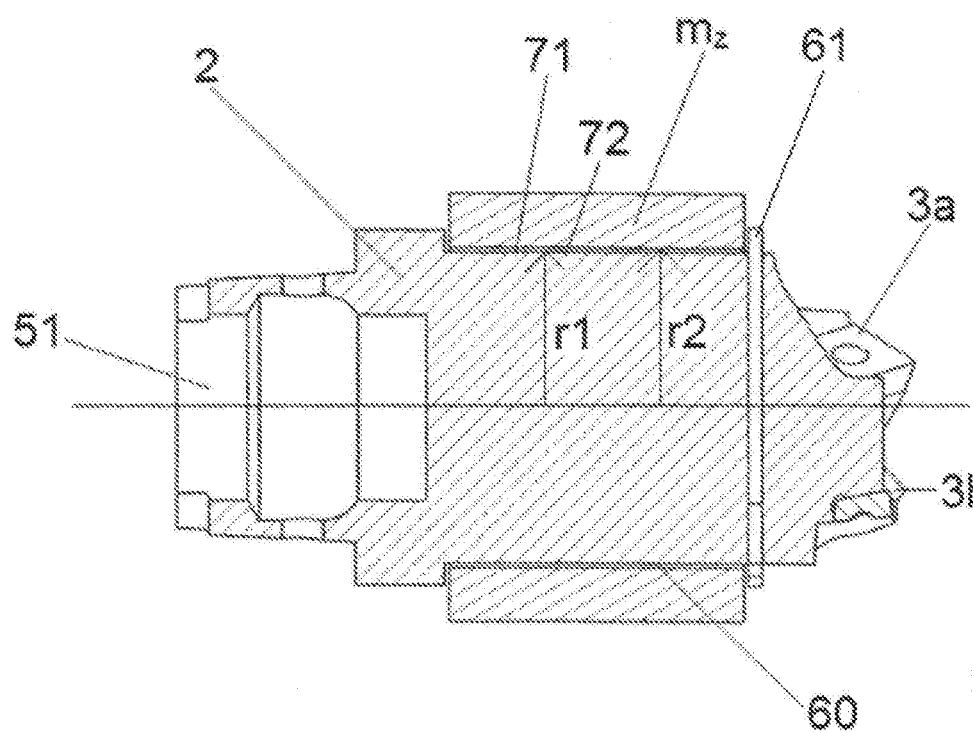

METHOD FOR REDUCING THE REGENERATIVE CHATTER OF CHIP-REMOVAL MACHINES

CROSS REFERENCE TO RELATED APPLICATION

This application is for entry into the U.S. National Phase under § 371 for International Application No. PCT/EP2016/053797 having an international filing date of Feb. 23, 2016, and from which priority is claimed under all applicable sections of Title 35 of the U.S. Code including, but not limited to, Sections 120, 363, and 365(c), and which in turn claims priority under 35 USC 119 to German Patent Application No. 10 2015 002 483.3β filed on Feb. 27, 2015.

The invention relates both to a method for reducing regenerative chatter, in particular chip-removal machines, and also to the chip-removal machine.

Chip-removal machines are, naturally, well known in the prior art in the form of rotating tool heads for pipe ends. A tool head is disclosed for example in EP 2 106 313 B1.

U.S. Pat. No. 2,699,696 discloses a boring head with a spindle, on the outer end of which a space for an additional weight is provided, wherein the space can be closed by means of a cap. Disadvantageously, the boring head disclosed there can be used exclusively with an additional weight.

DE 10 2009 009 212 B3 describes a vibration-damped tool for machining workpieces, wherein one or more displaceable vibration absorbers are fastened along the periphery of a basic tool body. A disadvantage of the tool is that the position of the vibration absorbers must be determined precisely in advance in order to damp the vibration optimally.

Chip-removal machines with rotating tool heads are bodies which are capable of vibration, with the aid of which pipe sections which have been cut to length are reworked. In particular the end of the pipe section can be provided with a chamfer. In order to form chamfers, the tool heads are moved in an extension of the longitudinal axis of the pipe section towards the pipe end, and the tool heads rotate and have one or more cutting plates, with the aid of which both an inner or outer chamfer and also a flat face are applied to the end of the pipe section. Chips are removed from the end of the pipe during application of the chamfers and of the flat face. The tool head is located at the end of a rotating spindle and together with the spindle forms a body which is capable of vibration. In principle both the outer and also the inner walls of the pipe sections are never exactly circular, so that load changes occur during the chip-removal operation. If the load changes are in the region of the natural frequency of the tool head mounted on the spindle, undesirable chatter can ensue. On the one hand the chatter subjects the chip-removal machine to loading, and on the other hand the workpiece surface to be produced is corrugated, which leads to losses of quality. The workpiece to be machined may even become unusable.

A special form of chatter is so-called regenerative chatter. The natural vibration of the tool head is repeatedly excited by the already produced surface corrugation which was formed by the same cutting tool in the already pre-machined surface. This results in chatter which is increasingly intensive.

In order to avoid regenerative chatter there are various approaches to a solution in the prior art.

For example, in the case of cutting tools with multiple cutters or reaming tools the cutters are arranged at different distances relative to one another and thus the excitation frequency is continuously changed during cutting. The consequence of this is that the regenerative chatter does not even occur in the ideal case.

In the case of tools with a single cutter, naturally, a change of the cutter spacing is not possible. However, it is known that a rotational speed of the rotating cutting tool is continuously changed quickly, but in the case of high frequencies this leads to substantial loading of the machine.

In addition, active damping systems are known in which the vibrations are detected electronically and the natural frequency of the system is changed by means of an additional mass. In addition there are passive damping systems, in which hydraulic dampers or additional spring/mass systems, so-called absorbers, are provided which for the most part eliminate the resonant frequency.

However, the said systems for preventing the regenerative chatter are exceptionally elaborate and also require intensive maintenance.

Therefore the object of the invention is to provide a simpler method for reducing the regenerative chatter and also a chip-removal device, in which the regenerative chatter occurs to a lesser extent, preferably not at all.

In the first aspect this object is achieved by a method with the features of claim 1.

In this case a workpiece is rotated relative to a tool head with at least one chip-removal tool. In a variant of the method the tool head can be held immovably relative to a chip-removal machine and the workpiece can be rotated. In another variant of the method according to the invention the workpiece is clamped immovably relative to the chip-removal machine and the tool head is rotated with respect to the workpiece. The tool head machines walls of the workpiece by means of the at least one chip-removal tool.

The workpiece may in particular be a metal workpiece, in particular an iron or steel workpiece; however, other materials are also conceivable. The workpiece preferably has an elongate shape. It may be a longitudinal profile, in particular a pipe or a solid profile of circular cross-section. The pipe can have an external and/or internal diameter which is circular over the entire length. However, the method is also applicable to other workpieces preferably having a circular internal or external cross-section, wherein "circular" here covers not only the mathematically exactly circular shape but also slight deviations from the mathematically exactly circular shape. The method is applicable in particular to precisely these real circular shapes.

The at least one chip-removal tool is arranged on one end of the tool head. Opposite the at least one chip-removal tool, on a different end of the tool head a receptacle is provided by which the tool head is fastened on a rotatable spindle driven by the chip-removal machine. The tool head can be easily exchanged with an additional mass.

The receptacle is preferably designed to be easy to manipulate as an internal thread, whereas the spindle has a corresponding external thread on an outer end.

The tool head is vibrationally excited during the machining, a loose additional mass is moved by the vibration. The loose additional mass randomly touches the tool head in first positions, and in second positions the additional mass has no connection to the tool head. In particular the additional mass also has no spring connection, damping connection or other connection to the tool head, but the additional mass is preferably completely surrounded with air in the second positions and more or less floats for a short time in space. As a result the mass of the tool head is randomly changed by the amount of the additional mass and the vibrational behaviour of the tool head is changed due to the mass change and thus counteracts regenerative chatter.

The method according to the invention makes use of the idea of randomly changing the vibrational behaviour of a tool head which is fixedly mounted on a rotatable spindle and which, during the machining operation, rotates about a longitudinal axis which corresponds to the longitudinal axis of the spindle. The vibrational behaviour of the tool head is substantially determined by the rigidity, in particular of the spindle, by the damping and also by the mass of the tool head and the spindle. In this case the damping results from the fact that a tool head vibrationally excited out of the longitudinal direction automatically moves into a rest state, from which the damping can be determined.

Furthermore, however, the method according to the invention makes use of the idea of letting the mass change take place randomly, in that an additional mass is arranged loosely on or in the tool head.

For this purpose the tool head can have a cylindrical interior space in which a cylindrical additional mass is located. The additional mass has a corresponding outer wall which is strictly circular in cross-section and is constantly circular over the entire longitudinal extent of the cylinder, as well as two end faces extending parallel to one another which are perpendicular to the corresponding walls. The cylinder has a radius which is somewhat smaller than an inner radius of the cylindrical interior space of the tool head. The distances between the end faces of the cylindrical opening are somewhat greater than a length of the cylindrical additional mass between the end faces thereof. In this way the cylindrical additional mass is arranged more or less loosely, i.e. freely movably within a clearance in all directions, in the interior of the tool head.

During the operation of the tool head, the additional mass with its corresponding outer wall bears during the relatively long time period against inner walls of the cylindrical opening of the tool head. However, if the tool head is set in small vibrations, such as for example as a regenerative chatter starts to build up, at specific times and in short time intervals the additional mass randomly loses its contact with the inner wall. The additional mass floats more or less contactlessly in the interior of the tool head, so that the mass of the tool head, which is responsible for the determination of the natural frequency, is reduced and thus changes the natural frequency of the tool head. Due to the change of the natural frequency the periodic stimulation of the already vibrating tool head, which is responsible for the regenerative chatter, can no longer lead to a buildup, i.e. to vibrational behaviour becoming more intensive with each revolution, because the natural frequency has just changed.

After the removal of the tool head from the spindle the interior space is freely accessible, and the additional mass can be removed or replaced.

In a further embodiment of the method according to the invention the additional mass is laid in an annular manner around an outer wall of the tool head. The outer wall of the tool head is circular in cross-section perpendicular to the longitudinal direction and has a radius, whilst an inner wall of the annular additional mass has a corresponding radius, which is somewhat greater than the radius, so that the ring likewise rests loosely on the outer wall of the tool head. In first positions the corresponding wall of the ring touches the outer wall of the tool head, in second positions the annular additional mass actually has no connection and also no contact with the tool head; it floats more or less around the tool head. The mode of action corresponds to the one mentioned above, and what is stated above also relates in full to this embodiment of the invention.

In a second aspect the object is achieved by a chip-removal machine with the features of claim 4.

The chip-removal machine is suitable in particular for carrying out one of the above-mentioned methods. The chip-removal machine has a tool head with at least one chip-removal tool for machining a wall of a workpiece as well as a loose additional mass which can have different positions relative to the tool head and which touches the tool head in first positions and which has no connection to the tool head in second positions, and the tool head has a first vibrational behaviour in first positions and a second vibrational behaviour in second positions.

With regard to the chip-removal machine the invention likewise makes use of the idea of changing the natural frequency of the tool head which is preferably suspended on a spindle and which can swing out of the longitudinal axis in all directions, in that the mass of the tool head is changed. However, the change of mass of the tool head does not take place in a controlled manner or mechanically, but randomly. The mass of the tool head is increased if the additional mass touches the tool head in first positions, and the mass is smaller by the additional mass if the tool head does not form any connection, not even a spring connection, damping connection or other connection, to the tool head. Due to the change of mass the vibrational behaviour of the tool head changes so that, as stated above, the regenerative chatter is counteracted. Surprisingly it has been shown that this simple variant of the random changing of the mass of the tool head in an exceptionally effective manner counteracts the regenerative chatter. In particular, undulating irregularities caused by the regenerative chatter can be almost completely avoided during the machining of pipe ends.

Advantageously the tool head has a wall which, in operation, rotates about a longitudinal axis and the additional mass has a rotating corresponding wall, wherein the corresponding wall, along its entire extent, in the second position is spaced apart from the rotating wall by a clearance. The additional mass and the tool head are movable relative to one another, wherein the relative movement area is very limited and is designated here as a clearance. The clearance preferably amounts to a few millimetres and, quite particularly preferably, is only in the micrometre range. Whereas in the first position the additional mass is placed on the walls, the additional mass is completely surrounded with air in second positions, it floats more or less relative to the tool.

In a preferred embodiment of the invention the wall is cylindrical, and the corresponding wall is likewise cylindrical. The wall is advantageously formed as an inner wall with a radius and the corresponding wall is formed as a corresponding outer wall with a corresponding radius which is smaller than the radius. The inner wall is the inner wall of a cylindrical interior space in the tool head and the corresponding outer wall is an outer wall of a cylinder which is loosely arranged in the interior space. The inner cylinder has a clearance in the interior space in each direction along its circumference and also its end faces.

In another embodiment of the invention an outer wall is constructed as a cylinder with a radius and a corresponding wall is constructed as a corresponding inner wall of an outer ring with a corresponding radius which is greater than the radius. In this case a ring is more or less fitted around a cylinder, wherein the ring rests loosely with a clearance on the cylinder and thus the tool head with the outer ring in contact with the tool head forms around the mass of the outer ring a greater mass than at the times at which the outer ring has no contact with the tool head.

The chip-removal operation here is a periodic operation, wherein irregularities in the machined tool surface periodically come into contact with the chip-removal tool and periodically excite this. If this periodic excitation in particular coincides with the natural frequency of the tool head, the vibration builds up and becomes a regenerative chatter. This is very loud and can lead to damage to the chip-removal tool and also to an exceptionally uneven workpiece surface.

Figure 2:
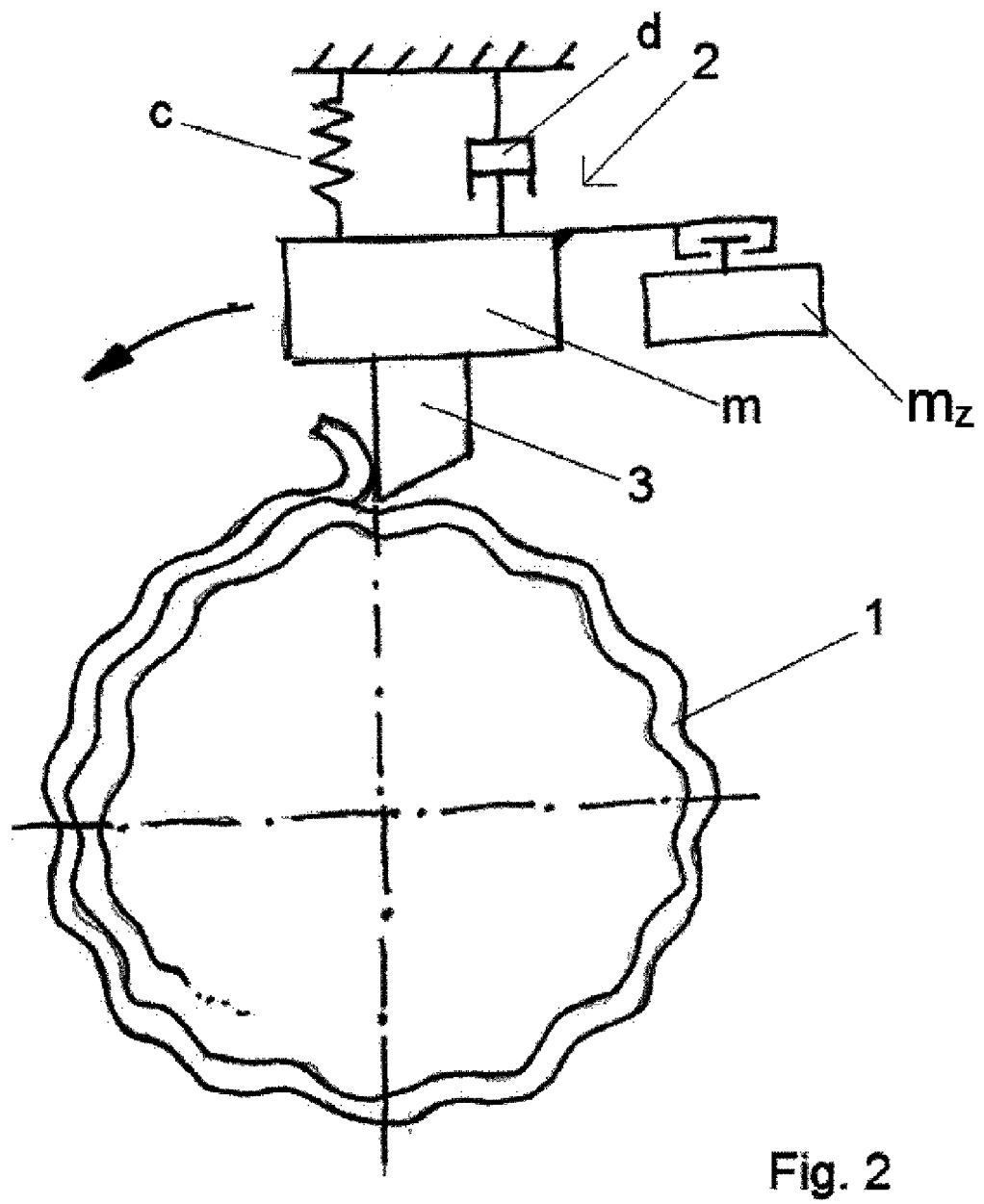
Figure 3:
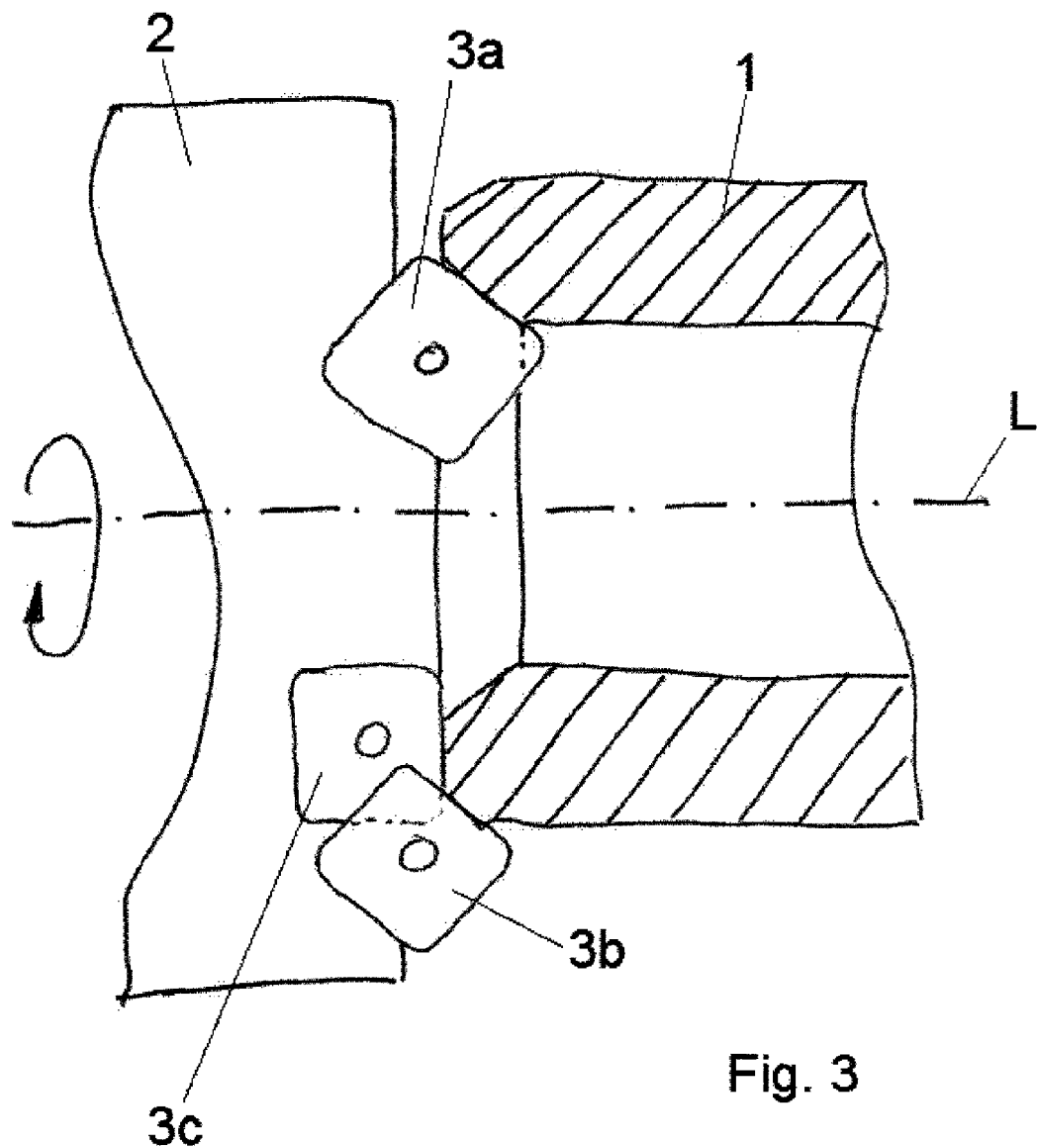
Figure 4:
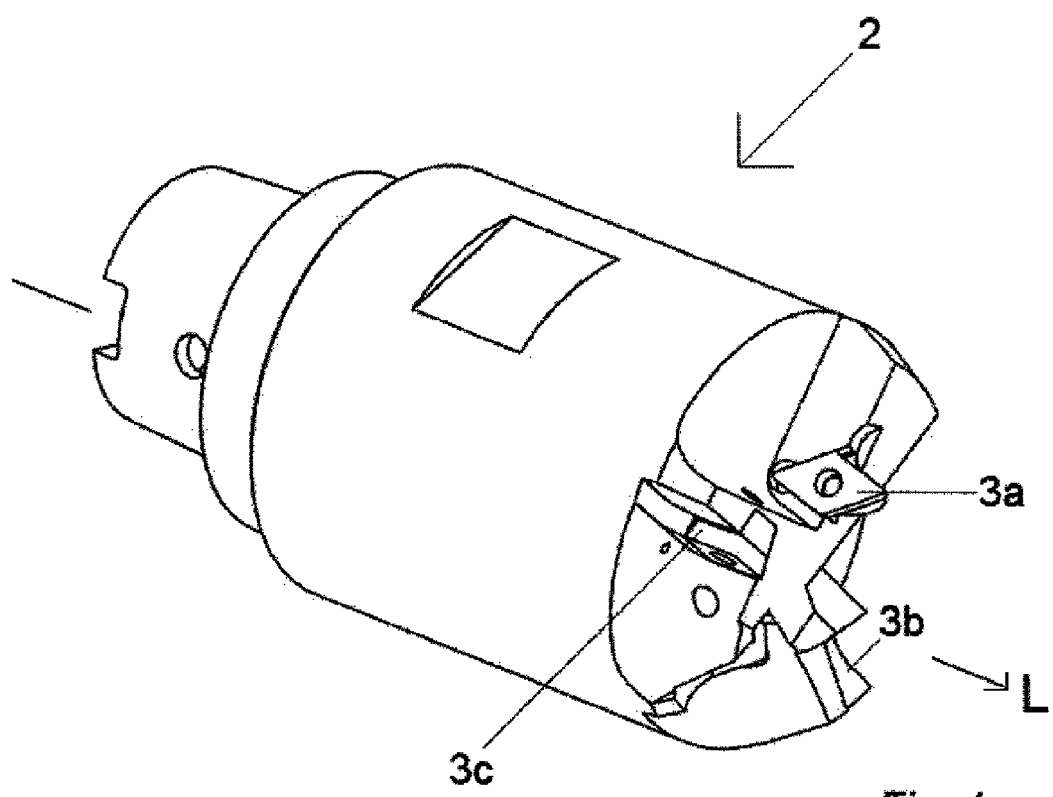
Figure 5:
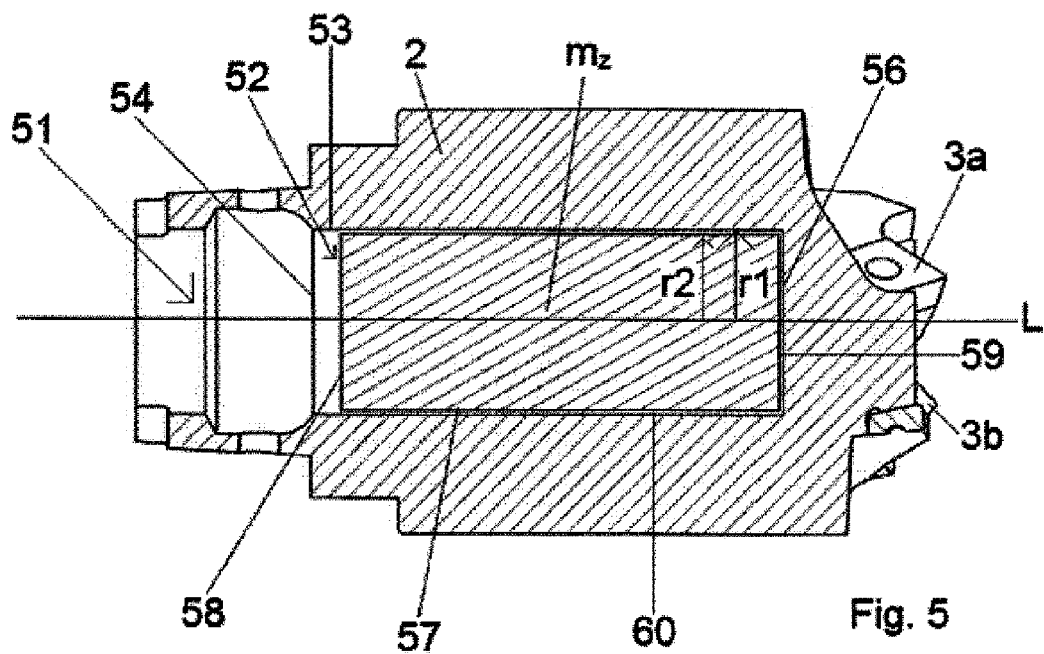
Figure 6:
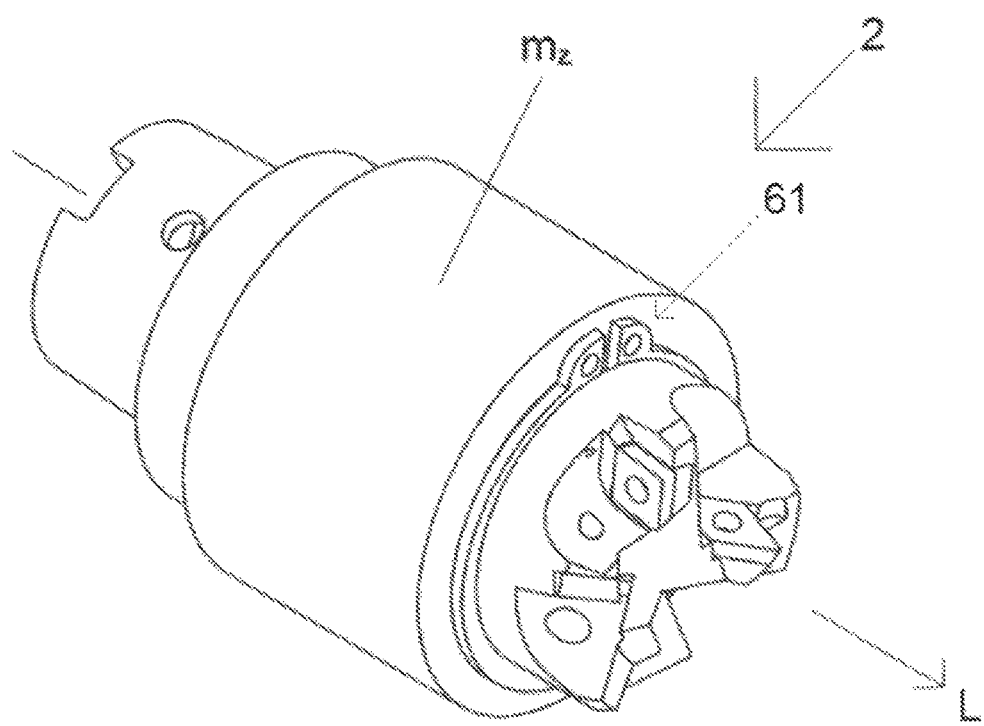

The invention is described with reference to two embodiments in seven drawings. In the drawings:

FIG. 1 shows a physical schematic view for explanation of the physical chatter of a chip-removal machine during chip removal on a surface, FIG. 2 shows a physical schematic view for explanation of the chip-removal machine according to the invention with an additional mass, FIG. 3 shows an arrangement of a tool head according to the invention relative to the workpiece during the chip-removal operation, FIG. 4 shows a perspective view of the tool head according to the invention in a first embodiment, FIG. 5 shows a sectional view in the longitudinal direction in FIG. 4 with an inner mass according to the invention, FIG. 6 shows a second embodiment of a tool head according to the invention, FIG. 7 shows a sectional view in the longitudinal direction in FIG. 6 with an outer mass according to the invention.

FIG. 1 shows schematically a workpiece which is substantially circular in cross-section, for example a pipe section 1 which is substantially circular in external cross-section. However, the workpiece can also be a solid profile or a profile which is solid and hollow in some sections. The workpiece is preferably made of metal, particularly preferably made of steel; however, other materials can also be envisaged. The pipe section 1 is machined by a tool head 2 which has precisely one individual cutting plate 3 in the schematic view. Naturally, the tool head 2 can also have two, three or any higher number of cutting plates 3. The tool head 2 and the pipe section 1 rotate relative to one another. In this case the tool head 2 can be held fixedly in space and relative to the chip-removal machine (not shown), and the pipe section 1 can be rotated about a longitudinal axis oriented in the longitudinal direction L, or the pipe section 1 can be fixed in space and relative to the chip-removal machine, and the tool head 2 can be rotated about the longitudinal axis about the pipe section 1, and in this case the cutting plate 3 rotates externally about the pipe section 1. During the rotation operation the cutting tool removes chips from an outer wall 4 of the pipe section 1. During the chip-removal operation load changes of the chip-removal forces occur, for example because the outer wall 4 is not exactly circular, which is actually always the case, so that in reality the removed chips have slightly different thicknesses. Even with ideally circular pipe sections 1, load changes can occur which lead to the tool head 2 first of all being set in slight vibrational movements which, however, can be periodically strengthened by continuous relative rotation of the tool head 2 and the pipe section 1 and lead to the so-called regenerative chatter.

The corrugation of the outer surface 4 of the pipe section 1 periodically repeatedly excites the tool head 2 to the same vibrations. Usually tool heads 2 rotate for example 5,000 r.p.m.; however, other rotational speeds are also conceivable. In particular the tool head 2 can be operated with a lower, but also with a higher rotational speed. The tool head 2 is mounted on a rotating spindle (not shown) oriented in the longitudinal direction L and can vibrate out of the longitudinal direction L. The vibrational behaviour of the tool head 2 is determined substantially by a rigidity c of the tool head 2 mounted on the spindle, a damping d and a mass m of the tool head 2 with the spindle. In particular a natural frequency $f_{eigen}$ of the tool head 2 is a function of these three parameters. In this case "natural frequency $f_{eigen}$" means the natural frequency with which the tool head 2 mounted on the spindle vibrates out of the longitudinal direction L.

The invention makes use of the idea, as shown in FIG. 2, of changing a total mass of the tool head 2 randomly and temporarily by an additional mass $m_z$ and as a result randomly and temporarily changing the vibrational behaviour.

The tool head 2 is rotated about the pipe section firmly gripped and fixed in a receptacle, and a total mass of the tool head 2 changes, depending upon whether the additional mass $m_z$ is connected to the tool head 2 or does not touch it and is not connected to it. If the additional mass $m_z$ is connected to the tool head 2, for example in that the additional mass $m_z$ touches the tool head 2, the natural frequency of the tool head 2 decreases; if the additional mass $m_z$ has no connection to the tool head 2 the natural frequency of the tool head 2 increases.

Due to the change of the vibrational behaviour of the tool head 2 a malfunction is more or less introduced into the chip-removal operation and counteracts a periodically strengthening vibration. A periodic excitation of the tool head 2 due to corrugations in the wall of the pipe sections 1 during the rotational movement does not lead to any resonance catastrophe in the form of a regenerative chatter, because the resonant frequency of the tool head 2 changes due to the change of mass.

FIG. 3 shows one end of a pipe section 1. This is a metal pipe. With the aid of the tool head 2 according to the invention with the aid of three cutting plates 3a, 3b, 3c an internal chamfer, an outer chamfer and a flat face are introduced into the metal tube, specifically in this correlation. The tool head 2 rotates with respect to the pipe section 1 which is gripped relative to the chip-removal machine. The pipe section 1 and the tool head 2 have the common longitudinal direction L. The tool head 2 rotates about a longitudinal axis oriented in the longitudinal direction L, and the longitudinal axis corresponds to the longitudinal axis of the pipe section 1.

FIG. 4 shows the tool head 2 according to the invention in a front view. In this case three cutting plates 3a, 3b, 3c are provided facing the pipe section 1 (not shown) and are mounted replaceably in corresponding holders on the tool head 2. The tool head is rotatable about the longitudinal direction L in both directions.

The tool head 2 illustrated in FIG. 4 is shown in FIG. 5 in a sectional view in the longitudinal direction L. The tool head 2 has an outer housing 50 with the tool head mass m. The three cutting plates 3a, 3b, 3c are arranged at one end of the tool head 2. A receptacle 51, by which the tool head 2 can be fitted on the chip-removal machine, is provided at another end. The one end and the other end are preferably opposite one another.

The additional mass $m_z$ according to the invention is constructed here as a loose, cylindrically shaped body arranged in a tool head 2. The tool head 2 has an interior space 52 with a cylindrical inner wall 53 and two end faces 54, 56. The two end faces 54, 56 are parallel to one another and are in each case arranged perpendicularly on the cylindrical inner wall 53.

In cross-section according to FIG. 5 the interior space 52 is rectangular. The dimensions of the rectangle can deviate from the illustrated form; a square interior cross-section can also be provided. The additional mass $m_z$ is constructed as a cylinder, wherein a corresponding radius r2 of the cylinder is somewhat smaller than a radius r1 of the cylindrical interior space 52, so that the cylindrical additional mass $m_z$ has a clearance 60 circumferentially along an entire corresponding wall 57 and also on its end faces 58, 59, that is to say is spaced apart with respect to the cylindrical inner wall 53 and with respect to the end faces 54, 56 of the interior space.

FIG. 5 shows the tool head 2 in one of the second positions in which the additional mass $m_z$ does not touch the tool head 2. If the tool head 2 is not in operation, the tool head 2 is located in one of the first positions, in which the cylindrical additional mass $m_z$ rests its corresponding outer wall 57 on a section of the inner wall 53 of the tool head 2. During the operation the tool head 2 rotates with a substantial number of revolutions, for example 5,000 r.p.m. During a starting operation the inner cylinder initially rubs with its corresponding outer wall 57 on the inner wall 53 of the tool head 2 until due to friction the inner cylinder has taken on the rotational speed of the tool head 2. During the chip-removal operation, at the moment in which a regenerative chatter begins to form, the tool head 2 is set in slight vibration. In FIG. 5 these vibrations extend perpendicularly to the longitudinal axis oriented in the longitudinal direction L. The size of the clearance 60 is such that it has at most the amplitude of the still permissible chatter. If the tool head 2 begins to vibrate, during the vibration operation there are moments in which the cylindrical additional mass $m_z$ actually has no contact with the tool head 2, that is to say the corresponding outer wall 57 everywhere is circumferentially spaced apart from the inner wall 53 of the tool head 2, so that the total mass $m+m_z$ of the tool head 2 decreases by the additional mass $m_z$ to the tool head mass m. In this way the natural frequency $f_{eigen}$ of the tool head 2 changes, albeit only temporarily, but it changes so that the vibrational behaviour of the tool head 2 changes, so that it can no longer be excited increasingly by periodic excitation, and regenerative chatter is prevented.

The tool head 2 with the touching additional mass $m_z$ has a mass $m+m_z$ and thus a first natural frequency $f_{eigen}$ (c, d, $m+m_z$), and the tool head 2 without touching the additional mass $m_z$ has a mass m and a second natural frequency $f_{eigen}$ (c, d, m), which is different from the first natural frequency $f_{eigen}$ (c, d, $m+m_z$).

Experiments have shown that a regenerative chatter can be prevented exceptionally effectively by the simple measure of providing a loose additional mass $m_z$ in the tool head 2.

FIG. 6 shows a second embodiment of the invention, in which the loose additional mass $m_z$ is placed externally as an outer ring about the tool head 2. The additional mass $m_z$ is annular in shape and is provided with a corresponding inner wall 72, which in first positions rests on an outer wall 71 of a cylindrical tool head which is likewise in the section. A cramp 61 is shown which holds the ring-shaped additional mass on the tool head.

FIG. 7 shows the tool head 2 in FIG. 6 in a sectional view. The tool head 2 has the cylindrical outer wall 71 which has the radius r1, and the additional mass $m_z$ is of annular construction with the annular corresponding inner wall 72, which has the corresponding radius r2 which is somewhat greater than the radius r1. In second positions, of which one is illustrated in FIG. 7, the annular additional mass $m_z$ actually has no contact and no connection to the tool head 2. It is spaced therefrom by the clearance 60.

The operating principle is the same as in the first embodiment. Usually the outer ring rests with its corresponding inner wall 72 somewhere to the outer wall 71 of the tool head 2, and thus the tool head 2 has a mass $m+m_z$ which comprises the mass of the outer ring. During the chip-removal operation the tool head 2 is again excited to small vibrations at the start of the regenerative chatter, and the outer ring does not participate in these vibrations because of its inertia, so that during short periods of time it can occur that the outer wall 71 of the tool head 2 actually has no contact with the corresponding inner wall 72 of the outer ring and thus the mass m of the tool head 2 is reduced by the additional mass $m_z$ of the outer ring and thus in turn the natural frequency $f_{eigen}$ of the tool head, which is definitively determined by the mass m of the tool head 2 or $m+m_z$, is changed, so that regenerative chatter is prevented in a very simple manner.

LIST OF REFERENCE SIGNS 1 pipe section
2 tool head
3 cutting plate
3a cutting plate
3b cutting plate
3c cutting plate
4 outer wall
50 outer housing
51 receptacle
52 interior
53 cylindrical inner wall
54 end face
56 end face
57 corresponding wall
58 end face
59 end face
60 clearance
71 cylindrical outer wall
72 annular corresponding inner wall
c rigidity
d damping
m mass
$m_z$ additional mass
27 radius
r2 corresponding radius
$f_{eigen}$ natural frequency
$f_{eigen}$ (c,d,m) second natural frequency
$f_{eigen}$ (c,d,$m+m_z$) first natural frequency
L longitudinal direction

The invention claimed is:

1. Method for reducing regenerative chatter of a chip removal machine in that a workpiece (1) rotates in relation to a tool head (2) having at least one chip-removal tool (3, 3a, 3b, 3c) arranged at one end of the tool head (2), the tool head (2) machines walls of the workpiece (1) by means of the at least one chip-removal tool (3, 3a, 3b, 3c), the tool head (2) is vibrationally excited during the machining, a loose additional mass ($m_z$) is moved by the vibration, which additional mass randomly touches the tool head (2) in first positions or randomly has no connection to the tool head (2) in second positions, and thus the total mass of the tool head (2) is randomly changed by the amount of the additional mass ($m_z$) and the vibrational behaviour of the tool head (2) is changed because of the mass change and thus counteracts regenerative chatter, and in that a receptacle (51), by means of which the tool head (2) can be exchangeably placed onto a spindle, is arranged at another end of the tool head (2) opposite the one end, wherein the additional mass ($m_z$) is of annular construction and has in the second position no contact and no connection to the tool head (2) and the wall is formed as an outer wall (71) with a radius (r1) and the corresponding wall is formed as a corresponding inner wall (72) with the corresponding radius (r2) which is greater than the radius (r1) and the additional mass ($m_z$), which is of annular construction is held by a cramp (61) at the tool head (2).

2. Chip-removal machine with a tool head (2) with at least one chip-removal tool (3, 3a, 3b, 3c) arranged on one end of the tool head for machining a wall of a workpiece (1), a loose additional mass ($m_z$) which can have randomly different positions relative to the tool head (2) and which touches the tool head (2) in first positions and which has no connection to the tool head (2) in second positions, wherein the tool head (2) has a first vibrational behaviour in the first positions and a second vibrational behaviour in the second positions and with a receptacle (51), by means of which the tool head (2) can be exchangeably placed onto a spindle, is arranged at another end of the tool head (2) opposite the one end, wherein the additional mass ($m_z$) is of annular construction and has in the second position no contact and no connection to the tool head (2) and the wall is formed as an outer wall (71) with the radius (r1) and the corresponding wall is formed as a corresponding inner wall (72) with the corresponding radius (r2) which is greater than the radius (r1) and the additional mass ($m_z$), which is of annular construction, is held by a cramp (61) at the tool head.

3. Chip-removal machine according to claim 2, characterised in that the tool head (2) has a wall which, in operation, rotates about a longitudinal axis and the additional mass ($m_z$) has a rotating corresponding wall, which, along its entire extent, in the second positions is spaced apart from the rotating wall.

4. Chip-removal machine according to claim 2, characterised in that a wall (53, 71) is cylindrically shaped and a corresponding wall (57, 72) is likewise cylindrically shaped.

\* \* \* \* \*